UNITED STATES PATENT OFFICE 2,468,431 o-ALKOXYBENZOYL DERIVATIVES OF 4,4'-DIAMINOSTILBENE-2,2'-DISULFONIC ACID

Dale R. Eberhart, Bound Brook, Hans Z. Lecher, Plainfield, and Mario Scalera, Somerville, N. J., assignors to American Cyanamid Company, New York, N. Y., a corporation of Maine No Drawing. Application April 29, 1948,
Serial No. 24,106

3 Claims. (Cl. 260—509)

This invention relates to new stilbene derivatives. More particularly, it relates to new derivatives of 4,4'-diamino stilbene 2,2'-disulfonic acid, which are distinguished by their remarkable optical bleaching effects on cellulosic materials.

It is well known that cellulosic materials, such as cotton, linen, regenerated cellulose, paper and the like, even when thoroughly bleached, tend to develop an undesirable yellowish cast with age. This yellowness is aggravated by exposure to weather or by repeated launderings; and once developed, cannot be removed by subsequent bleaching or scouring treatments.

It has been a practice of many years to attempt to conceal this yellowing of cellulosic materials by incorporating therein blue pigments, or dyes, which, possessing as they do a color complementary to the natural yellow of the cellulose, in effect tend to neutralize it. For this purpose, the use of blue pigments, such as ultramarine or Alkali blue, as well as of certain fugitive blue dyestuffs, has been common practice in paper manufacture and laundry operations for many years.

While these blue coloring matters are effective, their use is subject to serious disadvantages. In particular, the addition of a blue color to a yellow does not result in a pure white, but rather in a gray; and the greater the intensity of the original yellow, the greater the amount of bluing necessary to hide it, and also the darker the grayish cast of the treated article or textile. Further, unless an exact balance is struck between the original yellow stain and the added blue color, the finished product is not white as desired, or even gray but may be actually colored blue, an effect familiar to all housewives who have used bluing in their laundry.

Some twenty years ago an entirely new concept was advanced as to a method of overcoming these difficulties. Instead of using a blue pigment which absorbs colored light in the yellow range, it was proposed to use a fluorescent blue substance, which emits colored light in the blue range. Thus the yellowing effect, which consists in absorbing the blue light, is truly destroyed by a substance which emits the same blue light; the result being a true white and not a gray.

This proposal, while theoretically sound, unfortunately did not produce any practical development in the art. This was principally due to the fact that a compound having suitable properties for use as an "optical bleaching agent" did not appear to be available. Such a compound should, if possible, combine in itself the properties of being:

1. Colorless in white light;
2. Strongly fluorescent under the influence of ultra-violet rays such as are present in sunlight;
3. Capable of fluorescing blue-white;
4. Sufficiently substantive to be absorbed from very low concentrations;
5. Resistant to the action of soap, chlorine bleaching, light and other such common agents;
6. Resistant to decomposition, with ageing, to produce colored products;
7. Available at a reasonable price in proportion to its effectiveness.

A great deal of effort was expended, both in the United States and in Europe, to find a compound combining the best possible compromise of the above listed properties. These efforts were successful only in part. It has been particularly difficult, and prior to the present invention practically impossible, simultaneously to satisfy the third, fourth, and fifth requirements in the above list.

Among the better of the many compounds tried, amino-stilbene derivatives have been mentioned; but all of the compounds disclosed in this class were found to give an undesirable red tinge to the treated articles or textiles. This result is particularly noticeable when larger amounts are applied or when the treatment in smaller amounts is repeated frequently. This reddish tinge is undoubtedly due to the incorrect shade of the fluorescent light emitted. It greatly limits the usefulness of the products, in particular for uses where repeated application to the same article is unavoidable, as in laundering textiles.

Many of the compounds of the prior art are also deficient in their substantivity. This makes them unsuited for a single application use in larger amounts where a startling effect is required, such as enhancing the whiteness of white-discharge effects on colored prints. Likewise, poor resistance to chlorine bleaching and to light makes most of these known products fall far short of what is desired and expected by the consumer.

It is, therefore, a principal object of the present invention to develop a new compound or compounds suitable for use as optical bleaching agents and combining a better combination of the above listed properties. In general, these objects have been accomplished by the preparation of acylated derivatives of 4,4'-diaminostilbene-2,2'-disulfonic acid in which the acylating group is an ortho-alkoxy benzoic acid residue.

The effectiveness of these compounds, for the purposes of this invention, is quite surprising in the light of past experience with aminostilbene derivatives. Our compounds combine to an amazingly high degree the various properties of affinity, high strength, and resistance to chemical and physical agents. It is particularly surprising in its possession of the correct hue of fluorescence, a property lacking in previously-considered aminostilbene derivatives. Since the theories and mechanism of fluorescence and of substantivity are vague and obscure in the present state of the art, it is not possible to offer any explanation for these unique properties of the o-alkoxy-benzoyl diamino stilbene derivatives, nor for the fact that these properties are not shared to any marked degree by similar compounds not possessing this exact configuration.

The o-alkoxybenzoyl diaminotilbene disulfonic acids herein disclosed will effectively neutralize yellowness of cellulosic textiles even when applied from very minute concentrations such as aqueous solutions containing less than one-half part per million of the optical bleaching agent. On the other hand, they can be applied from relatively concentrated solution, containing over 50 parts per million (.005%) of the agent when it is desirable to produce greatly enhanced whiteness and brilliance of colored white-discharge effects, without showing an undesirable reddish cast on the white goods. The application of these agents to textiles may be carried out in a separte rinse bath; or they may be used in conjunction with the soaping operation; or the agents may be intimately incorporated in soap, and marketed in that form, to enhance the normal cleansing and whitening action of soap; or they may be used in any other manner known to the trade.

Some variation is permissible in the alkoxy group of the compounds of the present invention. We consider any alkoxy group containing less than 5 carbon atoms to fall within the scope of our invention. The preferred embodiments are represented by the methoxy and ethoxy groups. However, n-propyloxy, i-propyloxy, and the 4 isomeric butyloxy groups are also suitable substituents.

The o-alkoxybenzoyl diaminostilbene disulfonic acids may be prepared by any desired method. However, it was found that a most excellent and convenient method of preparation is that shown in the copending application of Dale Eberhart, Serial No. 24,107, filed of even date. That method consists in acylating 4,4'-diaminostilbene-2,2'-disulfonic acid with the chlorides of o-alkoxy benzoic acids in aqueous medium and in the presence of low molecular weight ketones. These latter enhance the solubility of the reactants or of intermediate products in the aqueous medium.

By the use of such water-soluble diluents, nearly quantitative yields of the o-alkoxybenzoyl diaminostilbene disulfonic acids are obtained in a simple and economical operation in aqueous medium. This same very effective procedure is equally applicable to the preparation of other acyl amino derivatives of the diamino stilbene disulfonic acids.

The invention will be more fully set forth in conjunction with the following examples which are intended as illustrative only and not by way of limitation. All parts are by weight unless otherwise noted.

*Example 1*

55.5 parts of 4,4'-diaminostilbene-2,2'-disulfonic acid are dissolved in 185 parts of water by means of 12 parts of caustic soda. To this solution are added 45 parts of sodium carbonate dissolved in 220 parts of water followed by 300 parts of acetone. The mixture is stirred, cooled to 10° C. and a solution of 77 parts of o-methoxybenzoyl chloride in 60 parts of acetone is run in during one-half hour while keeping the temperature below 10° C. and adding additional sodium carbonate solution, if necessary, to keep the reaction mixture alkaline to brilliant yellow test paper. The light yellow slurry is stirred one hour longer, diluted with about 600 parts of water, stirred one-half hour, filtered, the cake washed first with 600 parts of cold sodium carbonate solution containing 12 parts of sodium carbonate, then with 100–125 parts of cold water and dried in air at 80–100° C. A nearly quantitative yield of bright yellow product is obtained.

*Example 2*

11.1 parts of 4,4'-diaminostilbene-2,2'-disodium sulfonate are dissolved in 35 parts of water, a solution of 9 parts of sodium carbonate in 45 parts of water is added, followed by 60 parts of acetone. The mixture is cooled with stirring to 10° C. or lower and at this temperature a solution of 16.6 parts of o-ethoxybenzoyl chloride in 12 parts of acetone is run in during ½–¾ hour adding additional sodium carbonate if necessary. The mixture is stirred one hour longer without temperature control, diluted with 120 parts of water, eventually filtered and the cake washed first with 2% sodium carbonate solution and then with a little cold water. On drying in air, an excellent yield of 4,4'-di-(o-ethoxybenzoylamino)stilbene-2,2'-disodium sulfonate is obtained.

*Example 3*

A solution of 4.45 parts of 4,4'-diaminostilbene-2,2'-disulfonic acid is prepared by adding the acid to 15 parts of water containing 0.96 part of caustic soda. To this solution is then added with stirring 20 parts of a solution containing 3.6 parts of sodium carbonate followed by 24 parts of acetone. After cooling to 10° C., a solution of 7.7 parts of o-butoxybenzoyl chloride in 5 parts of acetone is added during one-half hour. After stirring three hours longer the mixture is diluted with about 125 parts of water, filtered, washed first with dilute sodium carbonate solution and then with water and dried. A good yield of 4,4'-di-(o-butoxybenzoylamino)-stilbene-2,2'-disulfonic acid is obtained, in the form of its disodium salt.

We claim:

1. A member of the group consisting of the 4,4' - di(o-alkoxy) - benzoyl diaminostilbene-2,2'-disulfonic acids of the formula

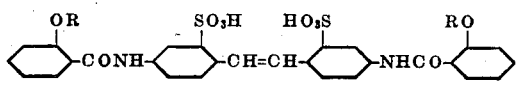

and the alkali metal salts thereof, wherein R is an alkyl radical of 1-4 carbon atoms.

2. A member of the group consisting of 4,4'-di(o-methoxybenzoyl) diaminostilbene-2,2'-disulfonic acid and the alkali metal salts thereof.

3. A member of the group consisting of 4,4'-di(o-ethoxybenzoyl) diaminostilbene-2,2'-disulfonic acid and the alkali metal salts thereof.

DALE R. EBERHART.
HANS Z. LECHER.
MARIO SCALERA.

REFERENCES CITED

The following references are of record in the file of this patent:

UNITED STATES PATENTS

| Number | Name | Date |
|---|---|---|
| 1,059,670 | Holste | Apr. 22, 1913 |
| 2,195,790 | Schmid | Apr. 2, 1940 |

FOREIGN PATENTS

| Number | Country | Date |
|---|---|---|
| 18,205 | Great Britain | 1911 |
| 584,484 | Great Britain | 1947 |
| 25,332 | Norway | Jan. 4, 1915 |
| 59,158 | Switzerland | Mar. 21, 1912 |
| 252,376 | Germany | May 6, 1911 |